(12) United States Patent
Hara

(10) Patent No.: US 8,069,303 B2
(45) Date of Patent: Nov. 29, 2011

(54) METHOD AND APPARATUS FOR CONTROLLING MEMORY PRECHARGE OPERATION

(75) Inventor: Soji Hara, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 891 days.

(21) Appl. No.: 12/037,541

(22) Filed: Feb. 26, 2008

(65) Prior Publication Data

US 2008/0209105 A1  Aug. 28, 2008

(30) Foreign Application Priority Data

Feb. 26, 2007  (JP) ................................ 2007-045233

(51) Int. Cl.
*G06F 12/00* (2006.01)
(52) U.S. Cl. ................. 711/104; 711/105; 711/E12.001
(58) Field of Classification Search .................. 711/104, 711/105, E12.001
See application file for complete search history.

(56) References Cited

U.S. PATENT DOCUMENTS

| | | | | |
|---|---|---|---|---|
| 6,615,326 | B1 * | 9/2003 | Lin | 711/154 |
| 2004/0193779 | A1 * | 9/2004 | Morita et al. | 711/5 |
| 2005/0071536 | A1 * | 3/2005 | Osborne | 711/5 |
| 2008/0091890 | A1 * | 4/2008 | Shrader et al. | 711/154 |
| 2009/0292886 | A1 * | 11/2009 | Shrader et al. | 711/158 |

FOREIGN PATENT DOCUMENTS

| | | |
|---|---|---|
| JP | 9-237490 A | 9/1997 |
| JP | 2002-342159 A | 11/2002 |

* cited by examiner

*Primary Examiner* — Shane M Thomas
(74) *Attorney, Agent, or Firm* — Fujitsu Patent Center

(57) ABSTRACT

A memory controller sequentially holds access requests including access addresses. A semiconductor memory includes a plurality of banks each having a plurality of pages. The memory controller decides page hit/page miss of the bank corresponding to each of the held access addresses. Further, the memory controller outputs an all-banks precharge command for performing a precharge operation of all the banks when deciding, based on an analysis of the successive access addresses, that outputting the all-banks precharge command results in improvement in access efficiency. It is possible to precharge the plural banks only by supplying the all-banks precharge command once, and therefore, in a case where the number of empty cycles for the insertion of a command is small, it is possible to supply the command efficiently to the semiconductor memory according to the states of the banks.

20 Claims, 17 Drawing Sheets

METHOD AND APPARATUS FOR CONTROLLING MEMORY PRECHARGE OPERATION

CROSS-REFERENCE TO RELATED APPLICATION

This application is based upon and claims the benefit of priority from Japanese Patent Application No. 2007-045233, filed on Feb. 26, 2007, the entire contents of which are incorporated herein by reference.

BACKGROUND

1. Field

The present embodiments relate to a memory controller controlling access to a semiconductor memory, and relates to a system.

2. Description of the Related Art

For improving access efficiency, many of semiconductor memories such as SDRAMs have a plurality of banks capable of independent operation. In order to access a memory cell in a semiconductor memory of this type, it is necessary to supply an activate command, a read or write command, and a precharge command. The activate command is a command for selecting a word line and latching, in a sense amplifier, data held in memory cells connected to the selected word line. The read command is a command for reading the data latched in the sense amplifier. The write command is a command for rewriting the data latched in the sense amplifier in order to write data to the memory cell. The precharge command is a command for resetting bit lines connecting the memory cells to the sense amplifier to a predetermined voltage.

Generally, a unit of data latched in a sense amplifier at a time is called a page. In a case where a memory cell stores one-bit data, the number of bits of one page equals the number of memory cells connected to one word line. To read or rewrite data latched in the sense amplifier, it is only necessary to supply a read command or a write command to a memory. On the other hand, to read or rewrite data not latched in the sense amplifier, it is necessary to supply an activate command prior to the read command or the write command. In a case where the sense amplifier is latching data of another page, it is further necessary to supply a precharge command prior to the activate command.

The state where data input/output is possible only with the read command or the write command is called page hit. On the other hand, the state where the activate command is necessary prior to the read command or the write command is called page miss. In a case where a semiconductor memory has a plurality of banks, page hit or page miss is decided for each bank.

Conventionally, in order to reduce access time, there has been proposed a method in which, when it is found that the state of a bank is page miss, a precharge operation of this bank is performed after a read operation or a write operation of another bank (for example, Japanese Unexamined Patent Application Publication No. Hei 9-237490; hereinafter, reference 1). There has also been proposed a method in which, when an activate command and a read command are supplied to a bank in response to an access request, a precharge command to a bank corresponding to a subsequent access request, if its state is page miss, is executed prior to the read command (for example, Japanese Unexamined Patent Application Publication No. 2002-342159; hereinafter, reference 2).

In the method of the reference 1, the time from the supply of the access request to the start of the access in the bank corresponding to the page miss is long. Therefore, in the entire memory including a plurality of banks, access efficiency is not improved. In the method of the reference 2, in a case where the state of the bank to be accessed next is page miss and an empty clock cycle exists, the precharge command is always inserted between the activate command and the read command in other words, the states (page hit or page miss) of the plural banks to be accessed at and after the third time are not used as a basis of the decision on whether to insert the precharge command or not. This necessitates inserting one precharge command per bank, and if there is no empty clock cycle, the precharge command cannot be inserted. As a result, access efficiency cannot be sometimes improved sufficiently.

SUMMARY

According to one aspect of the embodiment, a memory controller accessing a semiconductor memory sequentially holds access requests which include access addresses each indicating a memory cell to be accessed and which are supplied from a system controller. The semiconductor memory includes a plurality of banks each having a plurality of pages. The memory controller decides page hit/page miss of the bank corresponding to each of the plural held access addresses. Further, the memory controller outputs an all-banks precharge command for performing a precharge operation of all the banks when deciding, based on an analysis of the plural access addresses, that outputting the all-banks precharge command results in improvement in access efficiency.

DETAILED DESCRIPTION OF THE EMBODIMENTS

Hereinafter, embodiments will be described by using the drawings. Each signal line through which a signal is transmitted is denoted by the same reference symbol as the signal name. Each signal starting with "/" represents negative logic.

Figure 1:
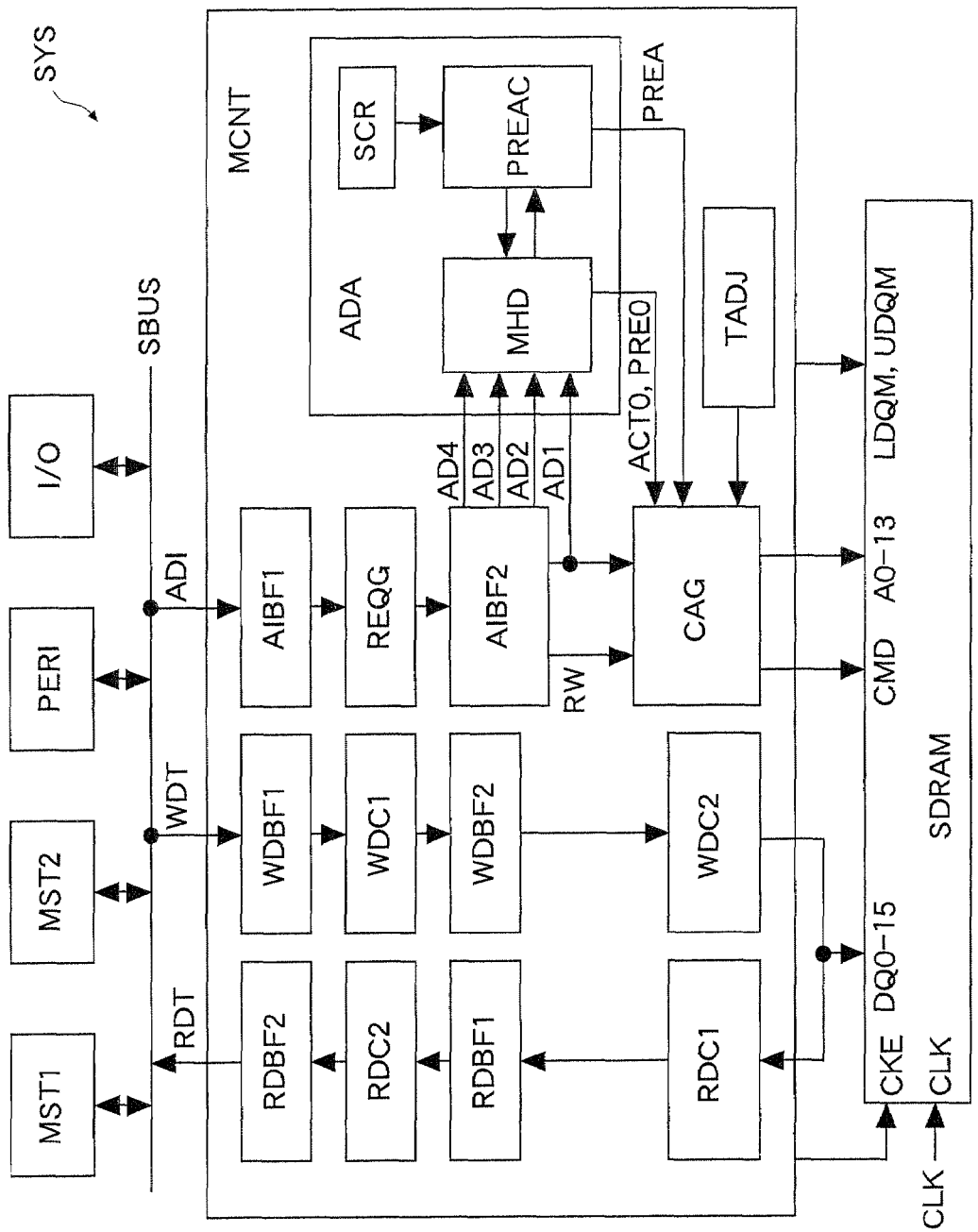
FIG. 1 is a block diagram showing a first embodiment.
Figure 5:
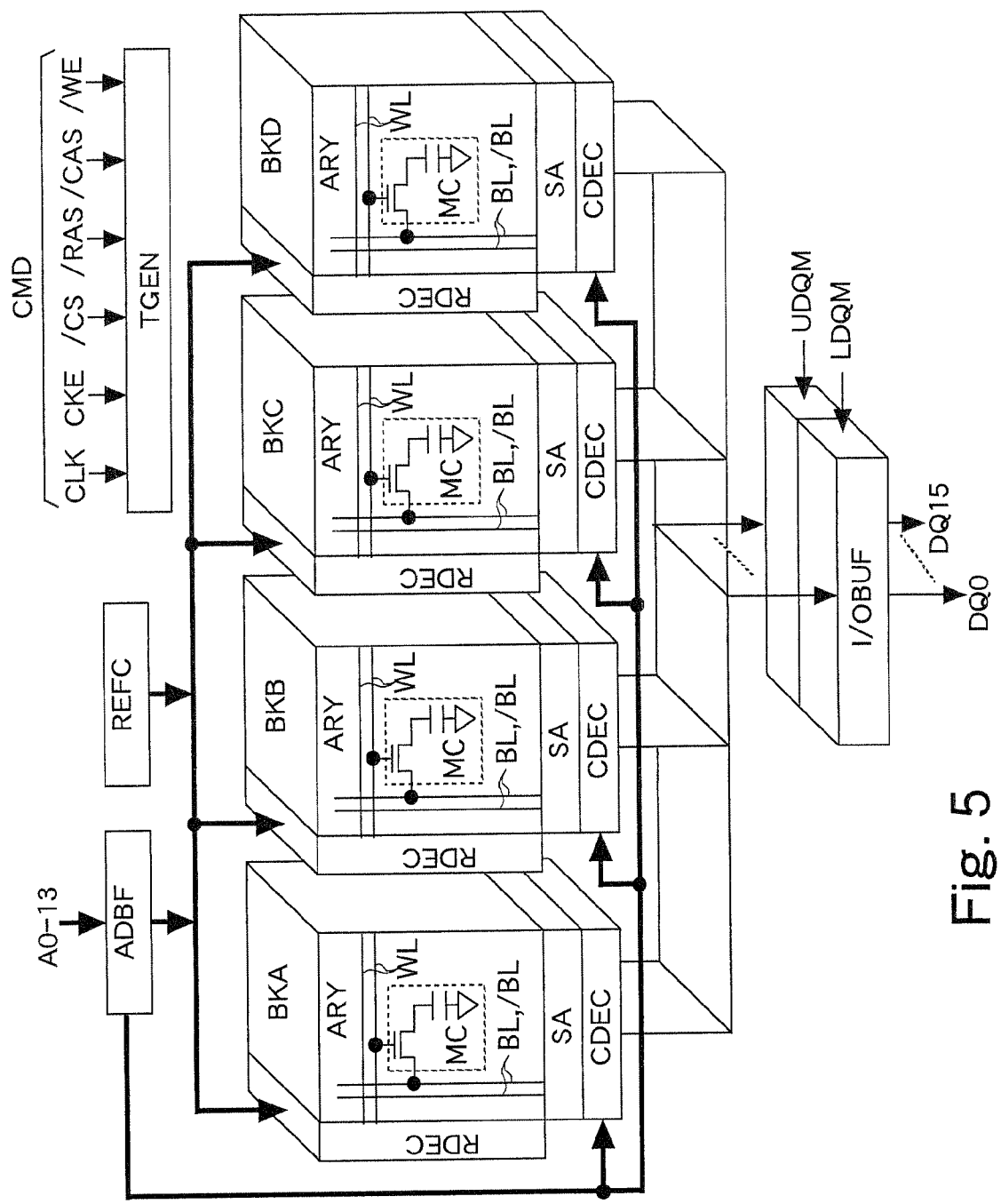
FIG. 5 is a block diagram showing details of a SDRAM shown in FIG. 1.

FIG. 1 shows a first embodiment. In this embodiment, a system SYS has: master controllers MST1, MST2 (system controllers), a peripheral circuit PERI, an input/output interface I/O, and a memory controller MCNT which are connected to a system bus SBUS; and a SDRAM (semiconductor memory) accessed by the memory controller MCNT. The master controllers MST1, MST2 are CPUs, DMACs, or the like controlling the operation of the whole system SYS. The peripheral circuit PERI is, for example, an image control circuit such as a MPEG controller. The input/output interface I/O is, for example, a USB interface circuit. The SDRAM has four banks BKA, BKB, BKC, BKD each having a plurality of pages. FIG. 5 shows details of the SDRAM.

The system SYS is configured by, for example, a control board of a mobile phone, a digital camera, or the like. For example, the master controllers MST1, MST2, the peripheral circuit PERI, the input/output interface I/O, and the memory controller MCNT are formed on one LSI chip as a SoC (System on Chip) and are mounted on the control board. The SDRAM is mounted on the control board as a stand-alone chip. Incidentally, the whole configuration shown in FIG. 1 may be formed as a SoC. It should be noted that the configuration of the system SYS is not limited to that in FIG. 1. As the minimum configuration, the system SYS has the master controller MST1, the memory controller MCNT, and the semiconductor memory such as the SDRAM.

The master controllers MST1-2 access a read data buffer RDBF2 when reading data RDT from the SDRAM, and access a write data buffer WDBF1 when writing data WDT to the SDRAM. The data is input/output to/from the SDRAM in response to write of address information ADI to an address information buffer AIBF1.

In the memory controller MCNT, a read data control unit RDC1 is an interface circuit for transferring, to a read data buffer RDBF1, read data (DQ0-15) sequentially read from the SDRAM. A read data control unit RDC2 is an interface circuit for transferring the read data held in the read data buffer RDBF1 to the read data buffer RDBF2 after changing a format of the read data in conformity with the specification (timing specification, the number of data transferred, and so on) of the system bus SBUS and the specification (the number of bits of data and so on) of the controller MST1 or MST2 outputting a read request.

The write data buffer WDBF1 sequentially holds write data supplied via the system bus SBUS. A write data control unit WDC1 is an interface circuit for transferring the write data held in the write data buffer WDBF1 to a write data buffer WDBF2 after changing a format of the write data in conformity with the specification of the SDRAM (the number of bits of the data and so on). A write data control unit WDC2 is an interface circuit for outputting the write data held in the write data buffer WDBF2 in conformity with the specification of the SDRAM (timing specification and so on). The buffers RDBF1-2, WDBF1-2 are, for example, FIFO memories.

The address information buffer AIBF1 sequentially holds the address information ADI supplied via the system bus SBUS. The address information ADI, which is generally called transaction, includes an access start address, read/write information, data size (bit width), burst length, burst type, and so on. The burst length is the number of words of data continuously input or output in response to one access request. The burst type indicates whether a burst access is performed across a plurality of memory areas or a burst access is performed circulatingly in one memory area.

A request generating unit REQG divides and converts the address information (transaction) held in the address information buffer AIBF1 into pieces of address information (access requests) conforming to a command system of the SDRAM, and transfers the converted address information to an address information buffer AIBF2. The address information held in the address information buffer AIBF2 includes access addresses AD (AD1, AD2, AD3, AD4, . . . ) and read/write information RW corresponding to the plural successive access requests. Each of the access addresses AD1-4 includes a bank address indicating a bank to be accessed of the SDRAM and a page address indicating a page thereof. The address information buffers AIBF1-2 and the request generating unit REQG function as a request hold unit sequentially holding the access requests which include the access addresses AD1-4 and which are supplied from the master controller MST1 or MST2.

An address analysis unit ADA has a miss/hit decision circuit MHD, an all-banks precharge control circuit PREAC, and a score memory unit SCR. Upon receipt of the four access addresses AD1-4, which are held in the address information buffer AIBF2, corresponding to the plural successive access requests, the miss/hit decision circuit MHD decides page hit/page miss of the bank corresponding to each of the access addresses AD1-4, according to current states of the banks. For this purpose, the miss/hit decision circuit MHD has a hold unit (a bank state unit BKST in FIG. 3) holding the current states of the banks based on an access address output to the SDRAM most recently. The miss/hit decision circuit MHD outputs an activate command ACT0 or a precharge command PRE0 to a command/address generating unit CAG according to the access address AD1.

According to the information on page hit/page miss from the miss/hit decision circuit MHD and score information stored in the score memory unit SCR, the all-banks precharge control circuit PREAC decides whether or not an all-banks precharge command PREA0 for performing a precharge operation of all the banks should be output to the command/address generating unit CAG. Specifically, the address analysis unit ADA outputs the all-banks precharge command PREA0 when deciding, based on the analysis of the plural access addresses AD1-4, that outputting the all-banks precharge command PREA results in improvement in access efficiency.

The score memory unit SCR is, for example, a rewritable (programmable) register in which predetermined scores are set upon power-on of the system SYS. Incidentally, the score memory unit SCR may be configured by a fuse circuit having a fuse programmed in manufacturing processes of the SoC. Forming the score memory unit SCR as a rewritable one allows a change of the scores stored in the score memory unit SCR after the SoC is designed. Alternatively, the score memory unit SCR may be configured by a logic circuit in which the scores are changeable according to a parameter when the SoC is designed. In this case, even in a case where the address analysis unit ADA is mounted on a plurality of kinds of SoCs with different specifications, the score memory unit SCR can be structured so as to be compatible to the respective SoCs only with a small logic change. A criterion for deciding whether to output the all-banks precharge command PREA or not will be described later.

The command/address generating unit CAG outputs a command CMD and addresses A0-13 to the SDRAM according to the access address AD1 and the read/write information RW which are supplied from the address information buffer AIBF2 and according to the commands ACT0, PRE0, PREA0 which are supplied from the address analysis unit ADA. At this time, the command/address generating unit CAG adjusts a supply cycle (the number of clock cycles) of the command CMD according to a control signal from a timing adjustment unit TADJ. The number of bits of the addresses A0-13 is not limited to 14 bits but changes depending on memory capacity of the SDRAM and the number of bits of the data DQ. Here, the command CMD includes a read command RD, a write command WR, an activate command ACT, a precharge command PRE, an all-banks precharge command PREA, and the like.

The SDRAM is a DRAM operating in synchronization with a clock CLK and besides terminals of the signals described above, it has a clock enable terminal CKE, a lower data mask terminal LDQM, an upper data mask terminal UDQM, and so on. Functions of these terminals are generally known and do not directly relates to the present embodiments, and therefore explanation thereof will be omitted.

Figure 2:
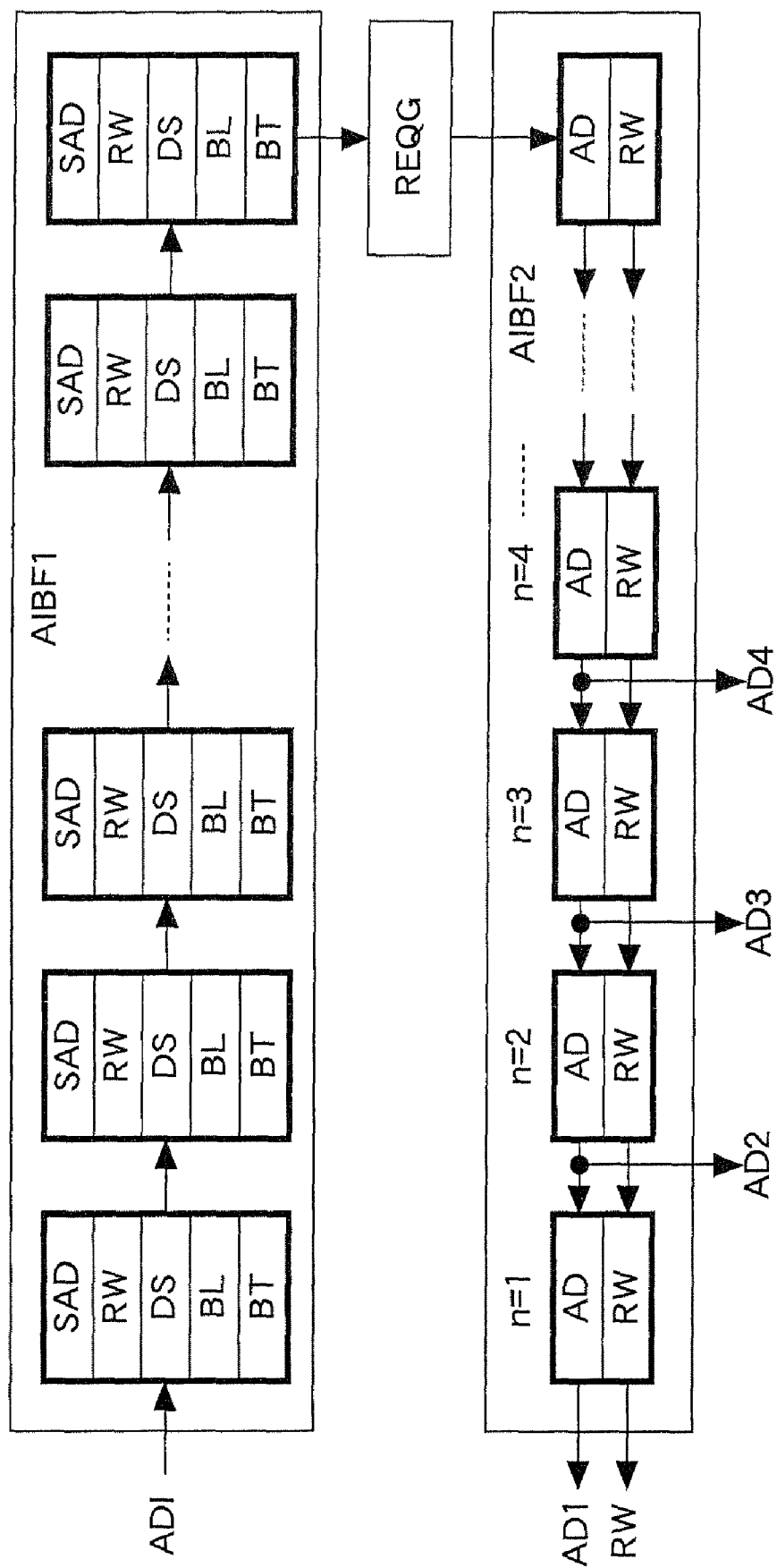
FIG. 2 is a block diagram showing details of address information buffers shown in FIG. 1.

FIG. 2 shows details of the address information buffers AIBF1-2 shown in FIG. 1. The address information buffer AIBF1 has a plurality of memory areas each holding the address information ADI (start address SAD, read/write information RW, data size DS, burst length BL, and burst type BT), and functions as a FIFO.

The address information buffer AIBF2 has a plurality of memory areas each holding the access request (access address AD and read/write information RW) generated by the request generating unit REQG, and functions as a FIFO. A value of n indicates the order in which the access requests are supplied to the SDRAM. The access request represented by n=1 is supplied to the SDRAM first. Each of the access addresses AD includes a bank address (A12-13) indicating the bank (BKA, BKB, BKC, BKD in FIG. 4) of the SDRAM, a row address (for example, A0-11) indicating a page (word line) in the bank, and a column address (for example, A0-9) indicating a bit line group in the bank. Address terminals A0-9 are common to the row address and the column address (address multiplex method).

In this embodiment, the address analysis unit ADA is supplied with, for example, the access addresses AD (AD1-4) included in the first to fourth (n=1, 2, 3, 4) access requests among the access requests held in the address information buffer AIBF1. Incidentally, the access addresses AD supplied to the address analysis unit ADA only have to include the bank addresses and the row addresses.

The command/address generating unit CAG shown in FIG. 1 outputs a read command or a write command according to the read/write information RW when the state of the bank accessed in response to the access request is page hit. The command/address generating unit CAG outputs the precharge command PRE (or the all-banks precharge command PREA), the activate command ACT, and the read command or the write command according to the read/write information RW when the state of the bank accessed in response to the access request is page miss and an active state. Further, the command/address generating unit CAG outputs at least the activate command ACT and the read command or the write command according to the read/write information RW when the state of the bank accessed in response to the access request is page miss and an idle state (inactive state).

Figure 3:
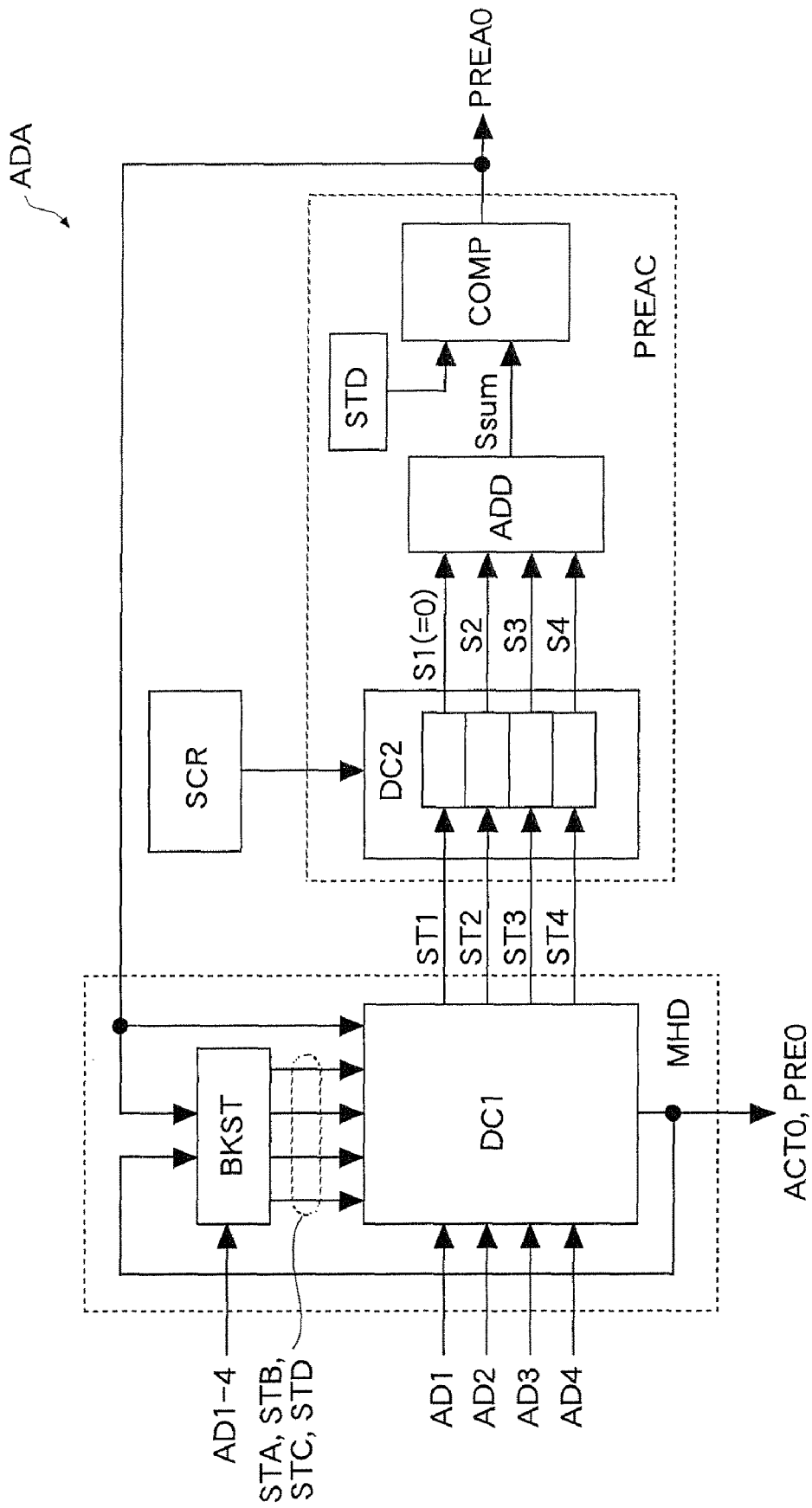
FIG. 3 is a block diagram showing details of an address analysis unit shown in FIG. 1.

FIG. 3 shows details of the address analysis unit ADA shown in FIG. 1. The miss/hit decision circuit MHD has the bank state unit BKST and a decision unit DC1. The bank decision unit BKST holds the current states of the banks BKA, BKB, BKC, BKD to output state signals STA, STB, STC, STD indicating these states respectively. Concretely, according to the access addresses AD1-4 and the commands ACT0, PRE0, PREA0, the bank state unit BKST stores which pages of the banks BKA, BKB, BKC, BKD are in the active state, or stores that the banks BKA, BKB, BKC, BKD are in the idle state, and outputs the stored states as the state signals STA, STB, STC, STD respectively. Therefore, the state signals STA-STD include information indicating the pages (row addresses) in the active state.

According to the state signals STA, STB, STC, STD, the decision unit DC1 decides page hit/page miss of the bank BK (at least one of BKA, BKB, BKC, and BKD) corresponding to the access addresses AD1-4, and outputs the decision results as the state signals ST1-4. The state signals ST1-4 are output in correspondence to the first to fourth (n=1, 2, 3, 4) access addresses AD1-4. Further, the decision unit DC1 outputs the precharge command PRE0 and the activate command ACT0 based on the decision results and based on the all-banks precharge command PREA0 from the all-banks precharge control circuit PREAC.

The all-banks precharge control circuit PREAC has a decision unit DC2, an additional unit ADD, a comparison unit COMP, and a standard set unit STD. The decision unit DC2 refers to the score information stored in the score memory unit SCR to find scores S1-4 corresponding to the state signals ST1-4. Details of the scores S1-4 will be described in FIG. 7, FIG. 9, FIG. 11, FIG. 12, and FIG. 13. The score S1 corresponding to the head access address AD1 is always set to "0". Therefore, for example, the decision unit DC1 do not have to generate the state signal ST1, nor does the decision unit DC2 have to generate the score S1.

The additional unit ADD adds the scores S1-4 to output the result as a sum value (Ssum). The comparison unit COMP outputs the all-banks precharge command PREA0 when the sum value Ssum is larger than a standard value set in the standard set unit STD, and does not output the all-banks precharge command PREA0 when the sum value Ssum is equal to or smaller than the standard value. In this example, the standard value is "0". The standard set unit STD may store an unchangeable fixed standard value, or may store a rewritable (programmable) standard value. In a case where the fixed standard value (for example, "0") is stored in the standard set unit STD, the standard set unit STD can be formed by, for example, a ground line in the comparison unit COMP.

Figure 4:
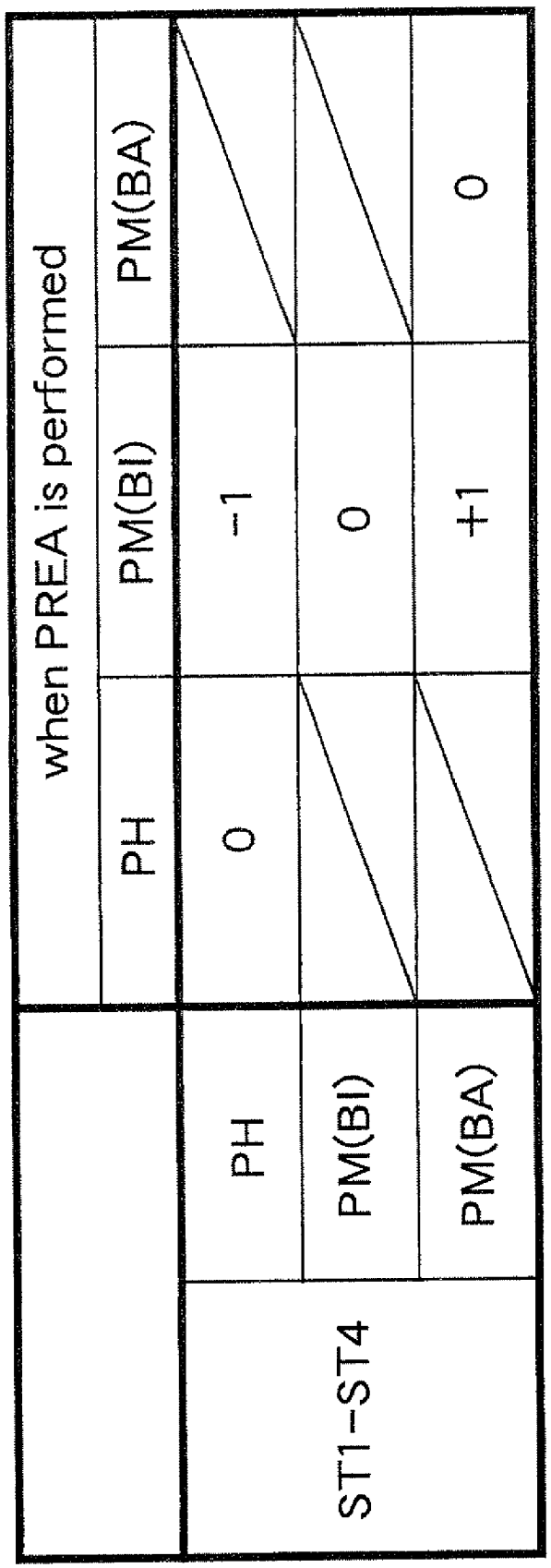
FIG. 4 is an explanatory view showing the gist of a score memory unit shown in FIG. 1.

FIG. 4 shows the gist of the score memory unit SCR shown in FIG. 1. The score memory unit SCR stores the scores corresponding to the combinations of the states of the bank BK indicated by each of the state signals ST1-4 (three states arranged in the vertical direction in the drawing) and states to which the state of the bank changes after the all-banks precharge command PREA0 is executed (three states arranged in the horizontal direction in the drawing). Each of the state signals ST1-4 indicates page hit/page miss of the access address (access request) with respect to the current state of the bank BK as described above. The state of the bank BK is one of page hit PH, page miss in a bank idle state PM (BI), and page miss in a bank active state (PM (BA)). The combinations corresponding to the diagonal lines in the drawing do not exist and thus their scores do not exist.

For example, when the PREA command is executed for a bank BK in the page hit state (PH), the state of the bank BK changes to page miss PM (BI). At this time, the ACT command is additionally required, which is disadvantageous, and therefore, the score is set to "−1". When the command PREA is executed for a bank BK in the idle state (PM (BK)), the state of the bank BK does not change and therefore the score is set to "0". Similarly, "from PH to PH" and "from PM (BA) to PM (BA)" involve no state change, and therefore the score is set to "0". When the command PREA is executed for a bank BK in the active state (PM (BA)), the state of the bank BK changes to page miss PM (BI). At this time, the PRE command becomes unnecessary, which is advantageous, and therefore the score is set to "+1". In this example, an increase/decrease of the score is defined based on an increase/decrease of the number of times an activate operation and a precharge operation are performed in response to a command.

FIG. 5 shows details of the SDRAM shown in FIG. 1. The SDRAM has, for example, the four banks BK (BKA, BKB, BKC, BKD) capable of independent operation, an address buffer ADBF, a refresh address counter REFC, a timing generator TGEN, a data input/output buffer I/O BUF, and so on. The SDRAM receives, as the command CMD, the clock CLK, the clock enable signal CKE, a chip select signal /CS, a row address strobe signal /RAS, a column address strobe signal /CAS, and a write enable signal /WE. Functions of the signals are generally known and therefore explanation thereof will be omitted.

Each of the banks BK has a memory cell array ARY, a row decoder RDEC, a sense amplifier SA, a column decoder CDEC, and a not-shown precharge circuit. The memory cell array ARY has a plurality of dynamic memory cells MC, word lines WL connected to the memory cells MC arranged in the horizontal direction in the drawing, and bit lines BL, /BL connected to the memory cells MC arranged in the vertical direction in the drawing. Each of the memory cells MC has a capacitor holding data as electric charge and a transfer transistor for connecting one end of the capacitor to the bit line BL (or /BL). A gate of the transfer transistor is connected to the word line WL.

Figure 6:
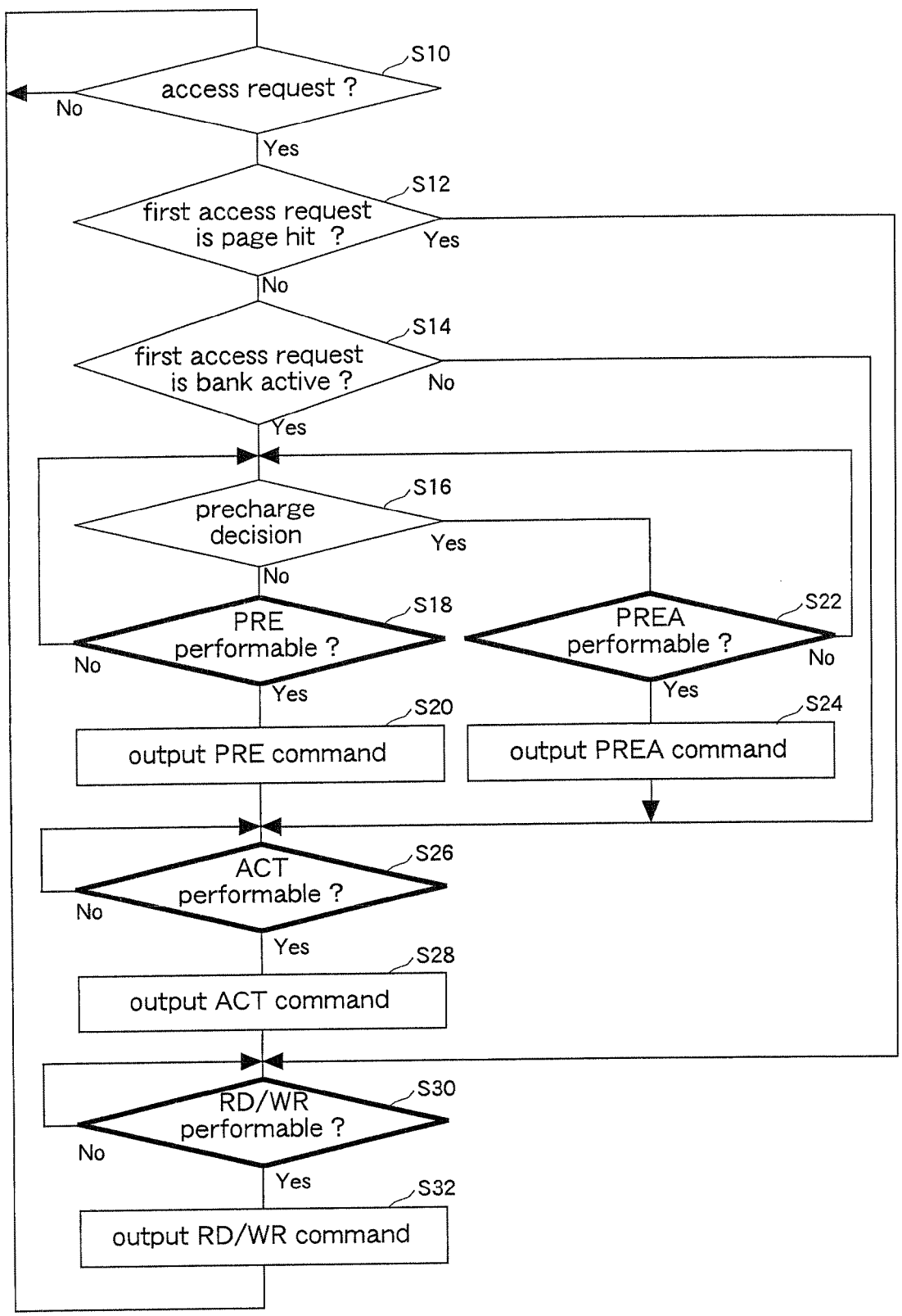
FIG. 6 is a flowchart showing the operation of a memory controller in the first embodiment.

FIG. 6 shows the operation of the memory controller MCNT of the first embodiment. FIG. 6 especially shows the operations of the address analysis unit ADA and the command/address generating unit CAG shown in FIG. 1. In each heavy-line diamond in the drawing, it is decided, based on the information from the timing adjustment unit TADJ shown in FIG. 1, whether or not a command is executable in a current clock cycle. In other words, each diamond includes a process for putting the SDRAM into operation based on timing specifications tRP, tRCD shown in FIG. 8.

First, at step S10, the address analysis unit ADA decides whether or not an access request is held in the address information buffer AIBF2. If no access request is held, step S10 is repeated. If an access request is held, the address analysis unit ADA decides at step S12 whether or not the state of the bank BK accessed in response to the head access request (n=1) is page hit. In a case of page miss, the process goes to step S14. In a case of page hit, since it is possible to access the SDRAM only by supplying the read command RD or the write command WR, the process goes to step S30.

At step S14, it is decided whether or not the bank BK accessed in response to the head access request (n=1) is in the active state. If the bank BK is in the idle state (inactive state), the process goes to step S26 in order to execute the activate command ACT (in order to latch data in the sense amplifier SA). If the bank BK is in the active state, the address analysis unit ADA decides at step S16 which of the precharge command PRE and the all-banks precharge command PREA should be executed, in order to perform an access operation in response to the head access request (precharge decision). The precharge decision depends on the scores shown in FIG. 4. Details of the precharge decision will be described in FIG. 7, FIG. 9, FIG. 11-FIG. 13.

If the precharge command PRE should be executed, the address analysis unit ADA outputs the precharge command PRE0 to the command/address generating unit CAG at step S18. When deciding, based on the information from the timing adjustment unit TADJ, that the precharge command PRE is executable, the command/address generating unit CAG outputs the precharge command PRE to the SDRAM at step S20. Similarly, when the all-banks precharge command PREA should be executed, the address analysis unit ADA outputs the all-banks precharge command PREA0 to the command/address generating unit CAG at step S22. When deciding, based on the information from the timing adjustment unit TADJ, that the all-banks precharge command PREA is executable, the command/address generating unit CAG outputs the all-banks precharge command PREA to the SDRAM at step S24. In a case where it is decided at steps S18, S22 that the commands PRE, PREA are not executable, the process returns to step S16. The SDRAM performs a precharge operation of one of the banks BK or a precharge operation of all the banks BK in response to the command PRE or PREA.

After the command PRE or PREA is output, the process goes to step S26. At step S26, the address analysis unit ADA outputs the activate command ACT0 to the command/address generating unit CAG. Based on the information from the timing adjustment unit TADJ, the command/address generating unit CAG decides whether or not the activate command ACT is executable. When the activate command ACT is executable, the command/address generating unit CAG outputs the activate command ACT to the SDRAM at step S28. In response to the command ACT, the SDRAM sets a page of the bank BK indicated by the access address AD (bank address and row address) to the active state. When the activate command ACT is not executable, the decision at step S26 is repeated at a subsequent clock cycle.

Next, at step S30, the command/address generating unit CAG decides whether or not the read command RD or the write command WR is executable, based on the information from the timing adjustment unit TADJ. When the command is executable, the command/address generating unit CAG outputs the read command RD or the write command WR to the SDRAM at step S32. In response to the command RD/WR, data indicated by the access address AD (column address) is input/output to/from the SDRAM. When the read command RD or the write command WR is not executable, the decision at step S30 is repeated at a subsequent clock cycle.

Figure 7:
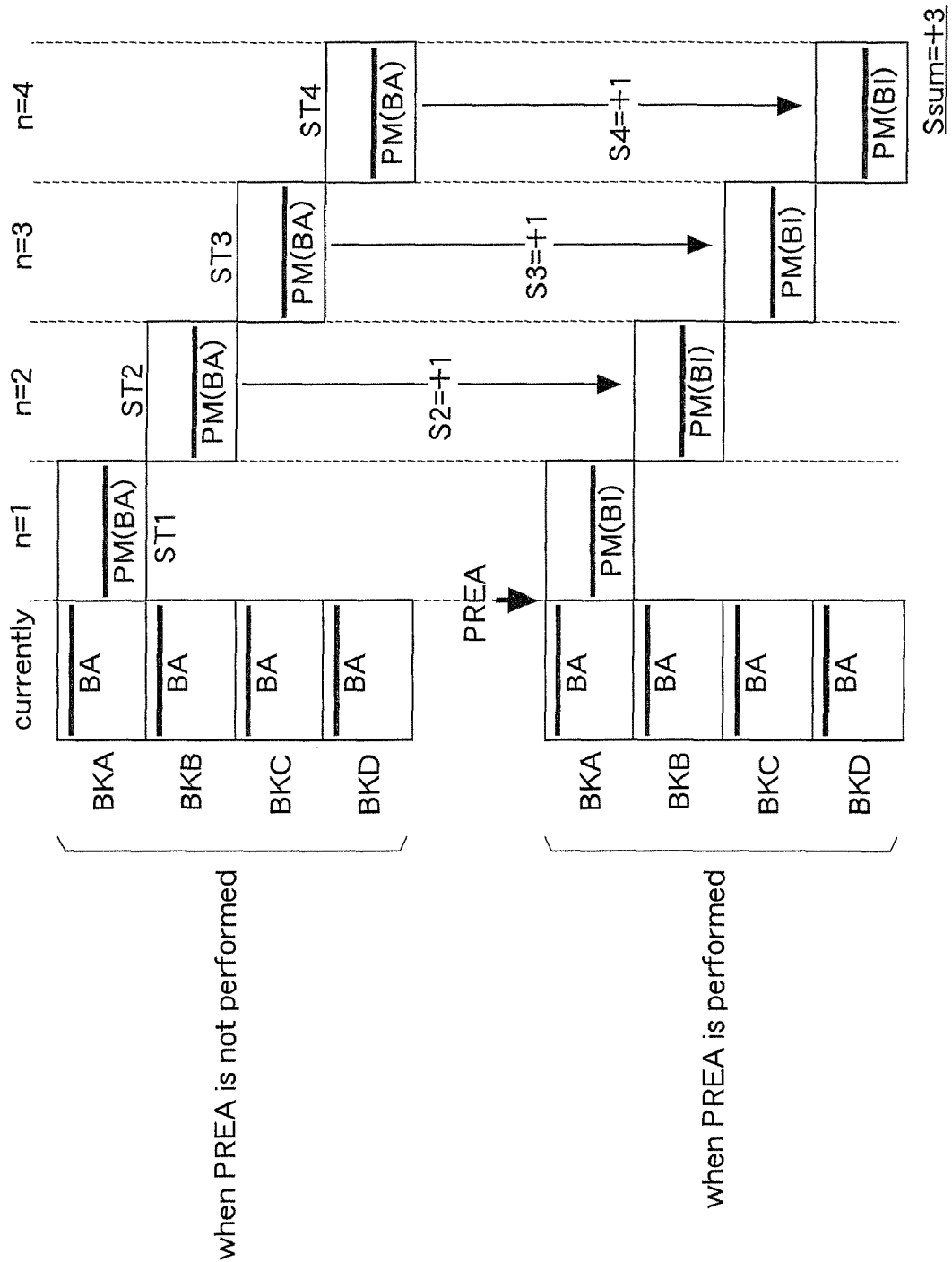
FIG. 7 is an explanatory chart showing an example of the operation of the address analysis unit shown in FIG. 3.

FIG. 7 shows an example of the operation of the address analysis unit ADA shown in FIG. 3. In the drawing, the quadrangular frames show the states of the banks BKA-BKD. The heavy line in each of the quadrangular frames indicates that the word line WL (page) is activated. The position of the heavy line indicates the position of the word line WL. The chart on the upper side in the drawing shows changes of the states of the banks BK when the all-banks precharge command PREA is not executed. The chart on the lower side of the drawing shows changes of the states of the banks BK when the all-banks precharge command PREA is executed.

In this example, when all the banks BKA-BKD are in the active state BA, access requests to the banks BKA, BKB, BKC, BKD are generated. Based on the current states of the banks BK and the access addresses (n=1-4), the decision unit DC1 shown in FIG. 3 decides whether the states of the corresponding banks BK are page hit/page miss when the all-banks precharge command PREA is not executed, and outputs the decision results as the state signals ST1-4. The decision unit DC2 finds the scores S2-4 of the second to fourth access requests according to the state signals ST1-4 and the values (FIG. 4) stored in the score memory unit SCR. Then, according to the sum value Ssum of the scores S2-S4, it is decided whether to generate the all-banks precharge command PREA or not. In this example, since the sum value Ssum is "+3" larger than the standard value "0", the command/address generating unit CAG outputs the all-banks precharge command PREA. Here, the sum value Ssum corresponds to a decremental number of clock cycles owing to the output of the all-banks precharge command PREA. Therefore, the sum value Ssum having a negative value (for example, FIG. 9) means that outputting the all-banks precharge command PREA results in an increase in the number of clock cycles and thus is disadvantageous.

Figure 8:
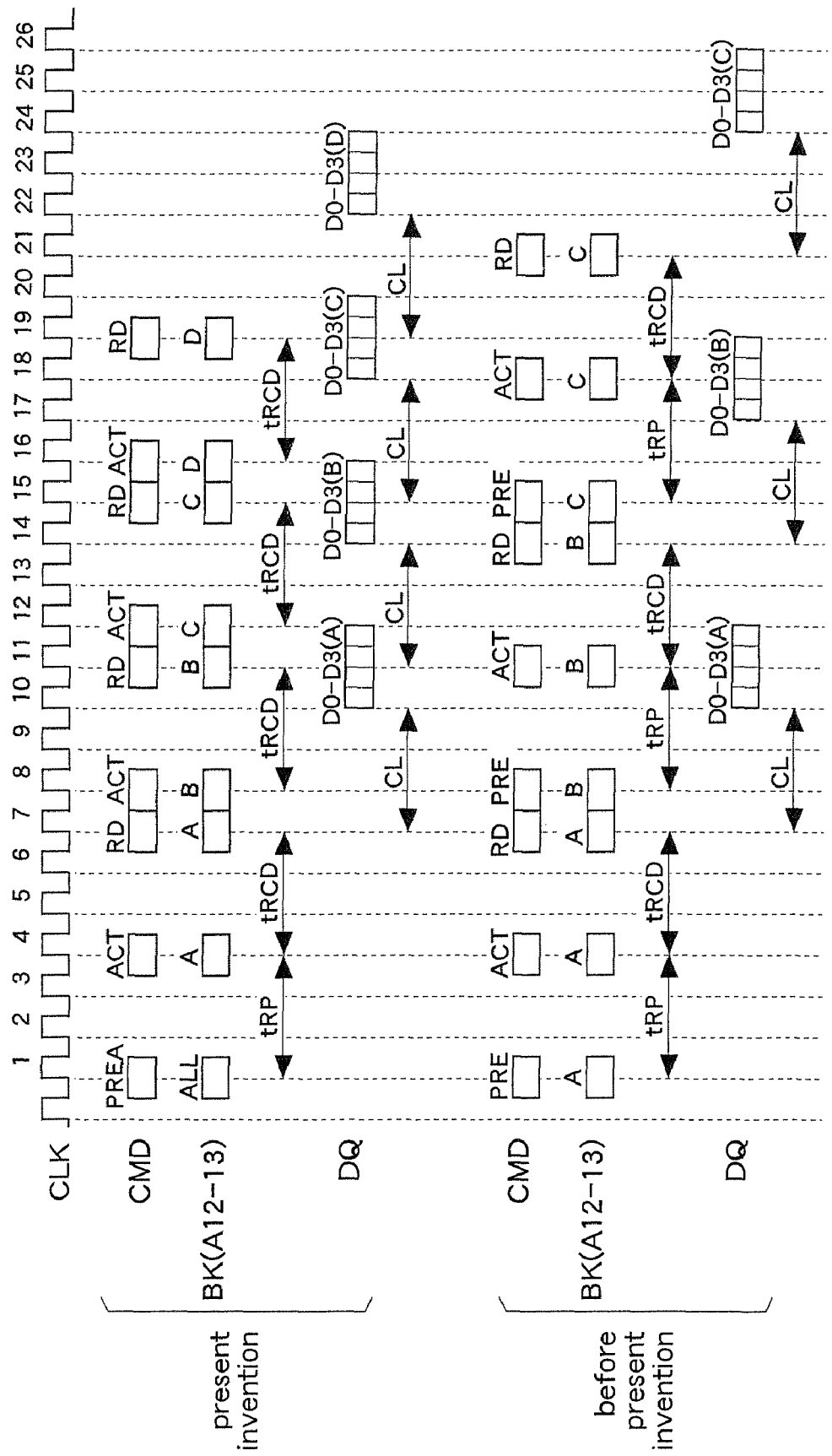
FIG. 8 is a timing chart showing the operations, corresponding to FIG. 7, of the memory controller and the SDRAM.

FIG. 8 shows the operations, corresponding to FIG. 7, of the memory controller MCN and the SDRAM. The specification tRP in the drawing is the minimum number of clock cycles from the supply of the precharge command PRE or PREA to the supply of the activate command ACT. The specification tRCD is the minimum number of clock cycles from the supply of the activate command ACT to the supply of the read command RD or the not-shown write command WR. A specification CL is the number of clock cycles from the supply of the read command RD to the start of data output. The signs A, B, C, D in the drawing represent the banks BKA, BKB, BKC, BKD respectively.

By the above-described operation of the address analysis unit ADA, the all-banks precharge command PREA is first issued, and thereafter, the activate command ACT and the read command RD for the bank BKA, the activate command ACT and the read command RD for the bank BKB, the activate command ACT and the read command RD for the bank BKC, and the activate command ACT and the read command RD for the bank BKD are sequentially issued, and data D0-D3 are read from the respective banks BK. Consequently, access efficiency can be improved, enabling an improvement in data transfer rate which is the number of input/output data in a predetermined number of clock cycles.

On the other hand, a memory controller before the present embodiment does not have the address analysis unit ADA deciding, based on a plurality of access addresses, whether to issue the all-banks precharge command PREA or not. Therefore, the precharge command PRE is issued for each bank BK, resulting in poor access efficiency and thus poor data transfer rate. Incidentally, the operation in a case where the write commands WR are supplied (write operation) is the same as the read operation except in that the first write data D0 is supplied in synchronization with the write command WR and thereafter the write data D1-3 are sequentially supplied. The write commands WR are supplied at the same timings as the read commands RD.

Figure 9:
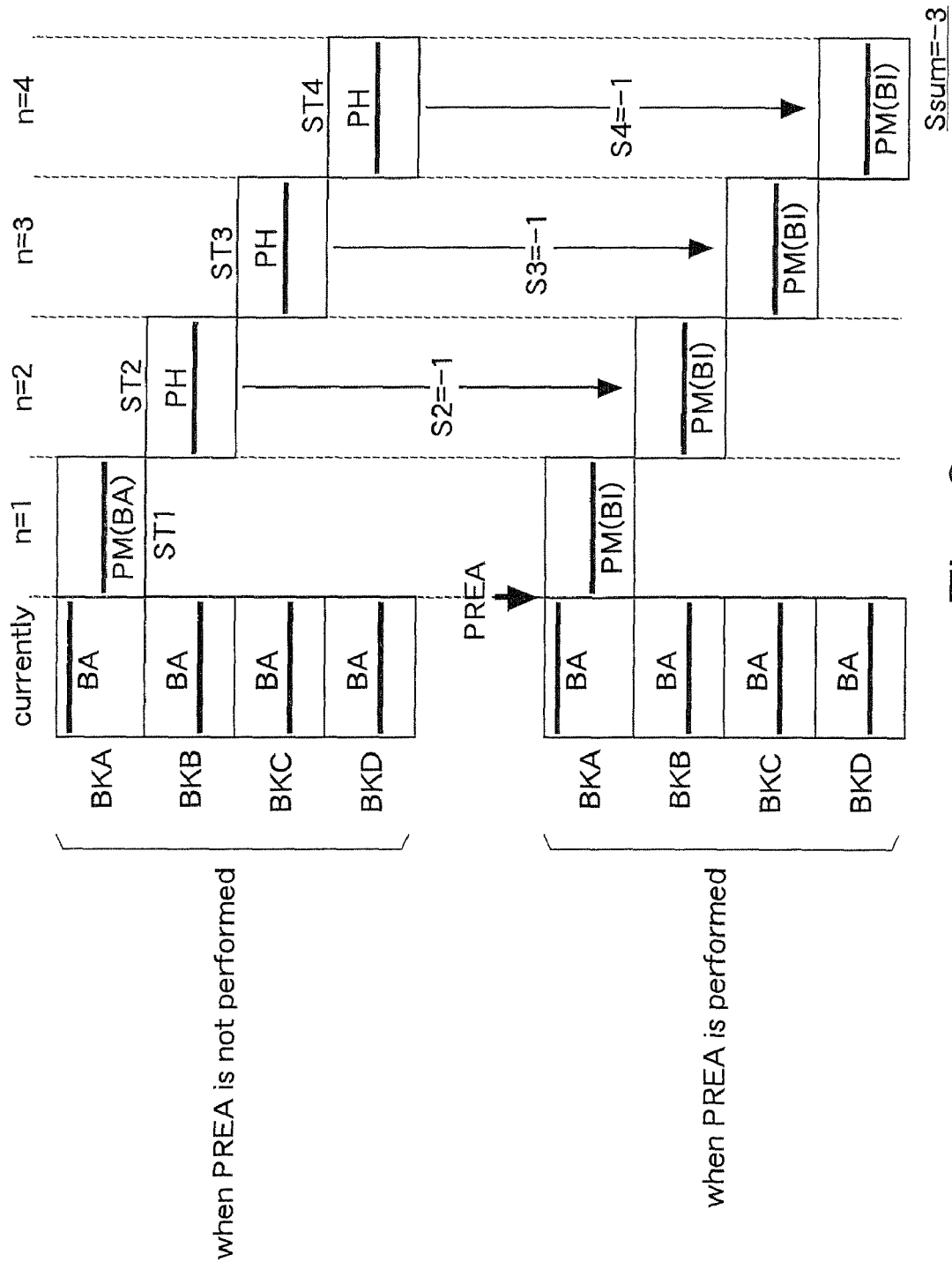
FIG. 9 is an explanatory chart showing another example of the operation of the address analysis unit shown in FIG. 3.

FIG. 9 shows another example of the operation of the address analysis unit ADA shown in FIG. 3. The notations in FIG. 9 mean the same as those in FIG. 7. In this example, when all the banks BKA-BKD are in the active state BA, access requests to the banks BKA, BKB, BKC, BKD are generated. Since the second to fourth access addresses (row addresses) are the same as the access addresses in the active state, the state signals ST2-4 indicate page hit PH. Therefore, the scores S2-4 are all "−1", and the sum value Ssum is "-3" smaller than the standard value "0". Therefore, the command/address generating unit CAG does not output the all-banks precharge command PREA but outputs the precharge command PRE to the bank BKA in response to the first access request. That is, when it is decided that outputting the all-banks precharge command PREA lowers access efficiency, the precharge command PRE is output. This can prevent an unnecessary precharge operation from being performed in the operation corresponding to the second and subsequent access requests and therefore can prevent access efficiency from lowering.

Figure 10:
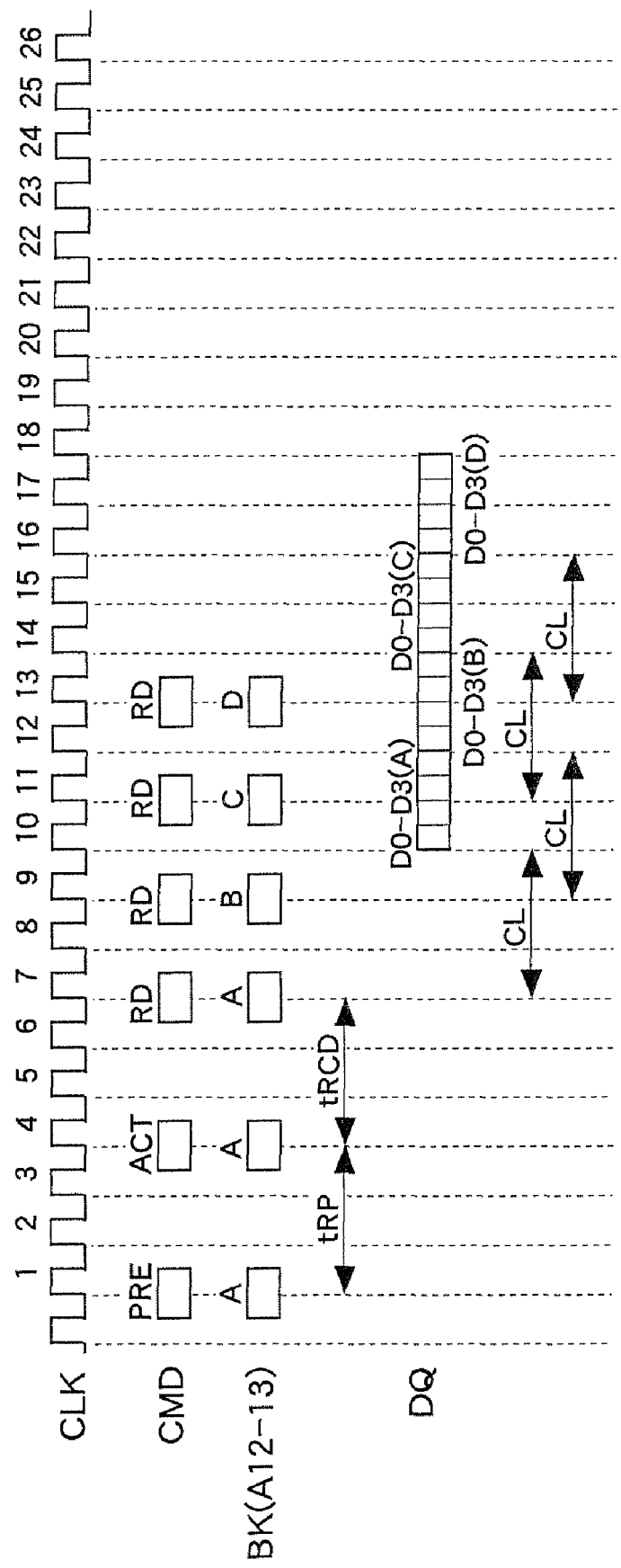
FIG. 10 is a timing chart showing the operations, corresponding to FIG. 9, of the memory controller and the SDRAM.

FIG. 10 shows the operations, corresponding to FIG. 9, of the memory controller MCNT and the SDRAM. In this example, by the above-described operation of the address analysis unit ADA, the precharge command PRE for the bank BKA is first issued, and thereafter, the activate command ACT and the read command RD for the bank BKA are issued. The banks BKB, BKC, BKD whose states are page hit sequentially receive only the read command RD and sequentially perform a read operation. In this example, the address analysis unit ADA decides not to output the all-banks precharge command PREA, which can prevent a useless activate command ACT from being issued.

Figure 11:
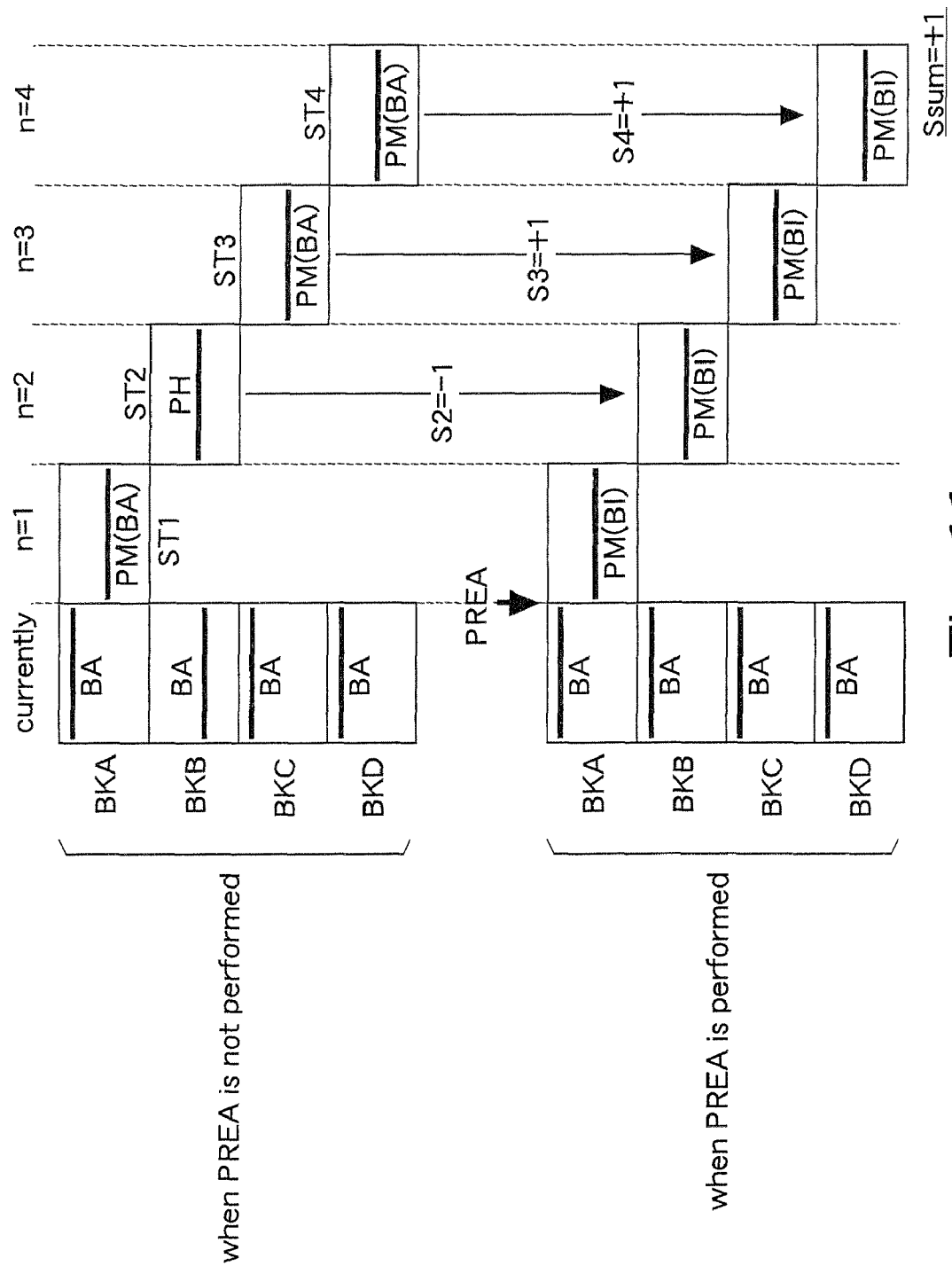
FIG. 11 is an explanatory chart showing another example of the operation of the address analysis unit shown in FIG. 3.

FIG. 11 shows another example of the operation of the address analysis unit ADA shown in FIG. 3. The notations in FIG. 11 mean the same as those in FIG. 7. In this example, when all the banks BKA-BKD are in the active state BA, access requests to the banks BKA, BKB, BKC, BKD are generated. The states corresponding to the second to fourth access addresses (row addresses) are page hit PH, page miss PM (BA), and page miss PM(BA) respectively. The sum value Ssum of the scores S2-4 is "+1" larger than the standard value "0". Therefore, the command/address generating unit CAG outputs the all-banks precharge command PREA.

Figure 12:
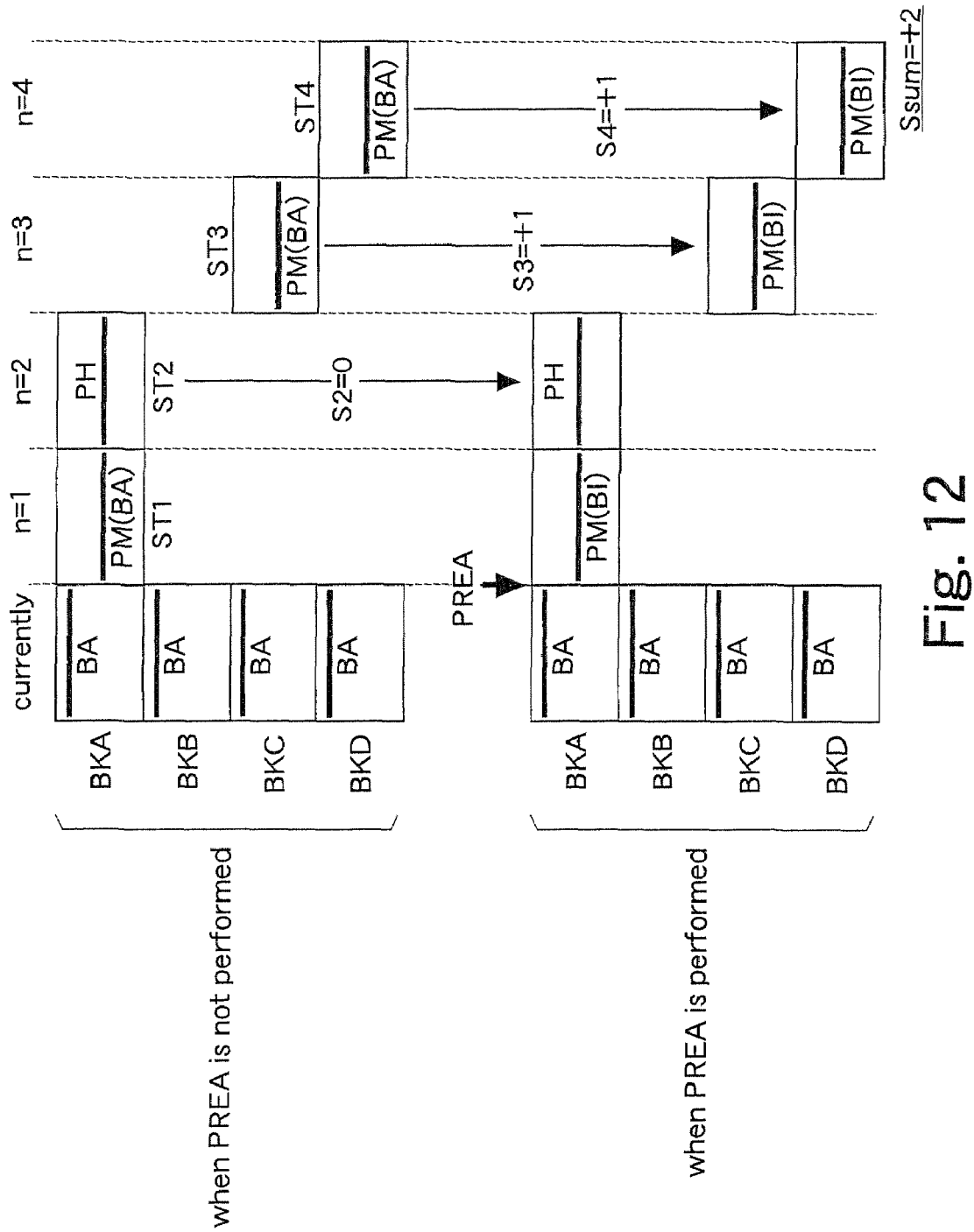
FIG. 12 is an explanatory chart showing another example of the operation of the address analysis unit shown in FIG. 3.

FIG. 12 shows another example of the operation of the address analysis unit ADA shown in FIG. 3. The notations in FIG. 12 mean the same as those in FIG. 7. In this example, when all the banks BKA-BKD are in the active state BA, access requests to the banks BKA, BKA, BKC, BKD are generated. The states corresponding to the second to fourth access addresses (row addresses) are page hit PH, page miss PM (BA), and page miss PM (BA) respectively. Here, since the second access address (row address) is the same as the first access address, the state corresponding to the second access address is page hit PH even after the all-banks precharge command PREA is executed. Therefore, the score S2 is "0". The sum value Ssum of the scores S2-4 is "+2" larger than the standard value "0". Therefore, the all-banks precharge command PREA is output.

Figure 13:
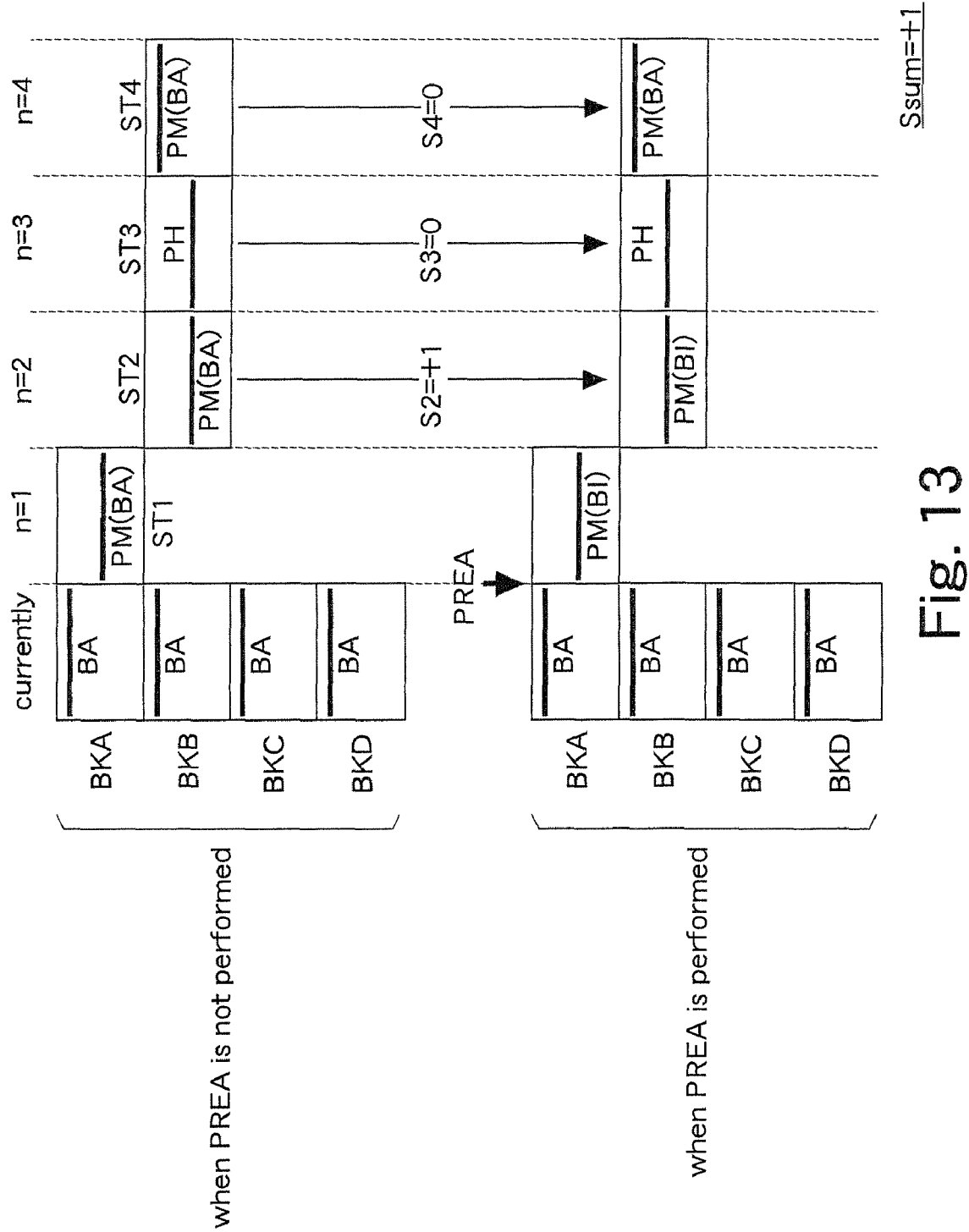
FIG. 13 is an explanatory chart showing another example of the operation of the address analysis unit shown in FIG. 3.

FIG. 13 shows another example of the operation of the address analysis unit ADA shown in FIG. 3. The notations in FIG. 13 mean the same as those in FIG. 7. In this example, when all the banks BKA-BKD are in the active state BA, access requests to the banks BKA, BKB, BKB, BKB are generated. The states corresponding to the second to fourth access addresses (row addresses) are page miss PM (BA), page hit PH, and page miss PM (BA) respectively. Here, since the third access address (row address) is the same as the second access address, the state corresponding to the third access address is page hit PH even after the all-banks precharge command PREA is executed. Further, since the fourth access address (row address) is different from the third access address, the page miss PM (BA) state does not change even after the all-banks precharge command PREA is executed. Therefore, the scores S3, S4 are both "0". Since the sum value Ssum of the scores S2-4 is "+1" larger than the standard value "0", the all-banks precharge command PREA is output.

In the foregoing first embodiment, since whether to output the all-banks precharge command PREA or not is decided by the address analysis unit ADA based on the second to fourth access requests, it is possible to efficiently supply a command to the SDRAM according to the states of the banks BK (page hit/page miss). Since it is possible to precharge all the banks BK only by supplying the all-banks precharge command PREA once, access efficiency can be improved even when the number of empty cycles for the insertion of a command is small. In other words, the number of clock cycles used for the supply of a command can be reduced to a minimum, which can improve a data transfer rate of the SDRAM.

The all-banks precharge command PREA is output according to the states of the banks BK accessed at and after the second time when the bank BK accessed first needs precharging (=page miss). Therefore, when the state of the bank first accessed is page hit, the all-banks precharge command PREA is not output. This prevents a delay in a read operation or a write operation of the first accessed bank BK, enabling improved access efficiency.

Since the decision on whether to output the all-banks precharge command PREA or not depends on the sum value Ssum of the scores S2-4, control logic of the decision can be simplified. Further, by configuring the score memory unit SCR storing the scores S2-4 by a programmable register or fuse circuit, it is possible to easily change a weight factor of the scores S2-4 according to the specification of the system SYS. That is, the criterion for deciding whether to output the all-banks precharge command PREA can be easily changed according to the specification of the system SYS.

When it is decided that the all-banks precharge command PREA should be output, the all-banks precharge command PREA is output prior to the activate command ACT corresponding to the head access request. Consequently, a precharge operation of the bank corresponding to the head access request and a precharge operation of the banks BK corresponding to the second and subsequent access requests can be performed simultaneously, enabling improved access efficiency.

When it is decided that outputting the all-banks precharge command PREA lowers access efficiency, the precharge command PRE is output and only the bank BK corresponding to the head access request is precharged. This can prevent an unnecessary precharge operation from being performed when the state of at least one of the banks BK corresponding to the second and subsequent access requests is page hit, which can prevent access efficiency from lowering.

Figure 14:
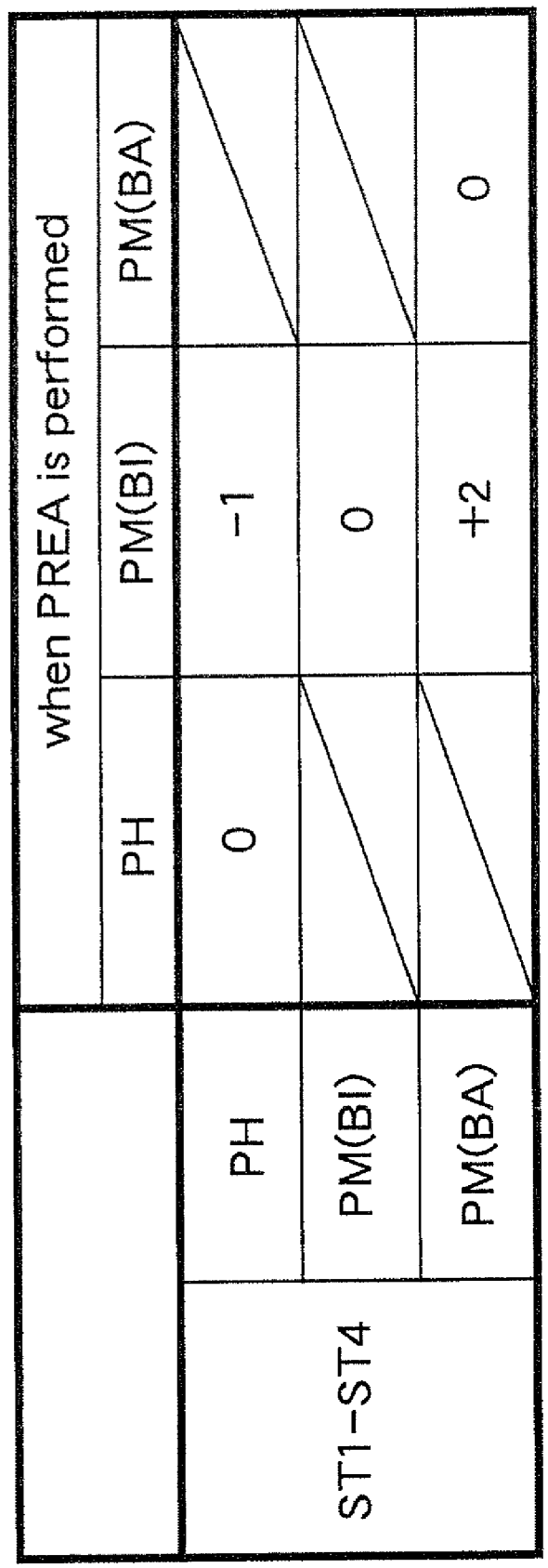
FIG. 14 is an explanatory chart showing the gist of a score memory unit in a second embodiment.

FIG. 14 shows the gist of a score memory unit SCR in a second embodiment. The configuration of the second embodiment except the score memory unit SCR is the same as the configuration of the first embodiment. The same reference numerals and symbols are used to designate the same elements as the elements described in the first embodiment, and detailed description thereof will be omitted.

In the score memory unit SCR, in a case where the execution of the command PREA for a bank BK in the active state (PM (BA)) changes the state of the bank BK to page miss PM (BI), the score is set to "+2" larger than the corresponding score of the first embodiment. That is, a weight factor of the scores is changed from that in the first embodiment. The standard value as a basis of the comparison by the comparison unit COMP is "0". Since the score memory unit SCR is configured by a programmable register or a programmable fuse circuit, it is possible to easily change the weight factor of the scores depending on each system SYS according to the specification of the system SYS. Further, in a case where the score memory unit SCR is configured by a logic circuit in which the scores are changeable according to a parameter, it is also possible to easily change the weight factor of the scores depending on each system SYS according to the specification of the system SYS.

The scores set in the score memory unit SCR may be values other than those shown in FIG. 4 and FIG. 14. For example, the scores may be set according to an increase/decrease of the number of clock cycles necessary for the operation. Concretely, let us assume that the number of clock cycles requiring for the state of the bank BK to become active in response to the activate command ACT is "1", and the number of clock cycles requiring for the state of the bank BK to become a precharge state (idle state) in response to the precharge command PRE, PREA is "2". In this case, in a case where the number of operations in response to the activate command decreases, the score is set to "+1", and in a case where it increases, the score is set to "−1". In a case where the number of operations in response to the precharge command PRE, PREA decreases, the score is set to "+2", and in a case where it increases, the score is set to "−2".

The foregoing second embodiment can also provide the same effects as those of the above-described first embodiment. In addition, in this embodiment, by changing the weight factor of the scores according to the operation specification of the SDRAM, the frequency of the clock CLK supplied to the SDRAM, or the specification of the system SYS, it is possible to configure an optimum system SYS with high access efficiency.

Figure 15:
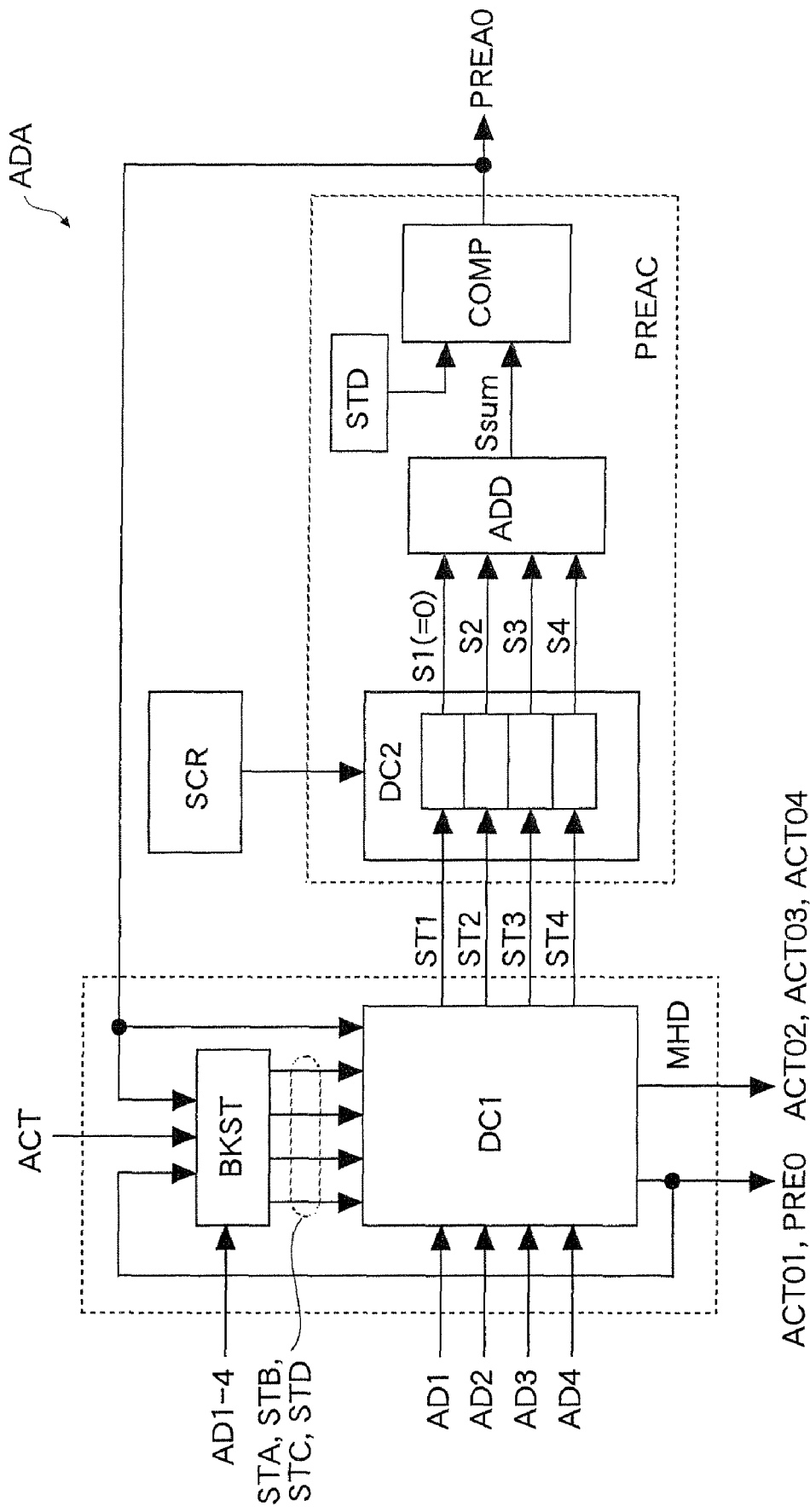
FIG. 15 is a block diagram showing details of an address analysis unit in a third embodiment.

FIG. 15 shows details of an address analysis unit ADA in a third embodiment. Its configuration except a miss/hit decision circuit MHD is the same as the configuration in the first embodiment. The same reference numerals and symbols are used to designate the same elements as the elements described in the first embodiment, and detailed description thereof will be omitted.

The miss/hit decision circuit MHD outputs not only an activate command ACT01 corresponding to the head access address AD1 but also activate commands ACT02-04. When the states corresponding to the second to fourth access addresses AD2-4 are page miss, the activate commands ACT02-04 are output in order to request the command/address generating unit CAG to output the activate commands ACT for the corresponding banks BK. Further, not only in response to the activate command ACT01 from the decision unit DC1 but also in response to the activate commands ACT, if output by the command/address generating unit CAG according to the second to fourth access addresses AD2-4, the bank state unit BKST of the miss/hit decision circuit MHD stores that the corresponding banks BK have become in the active state.

Figure 16:
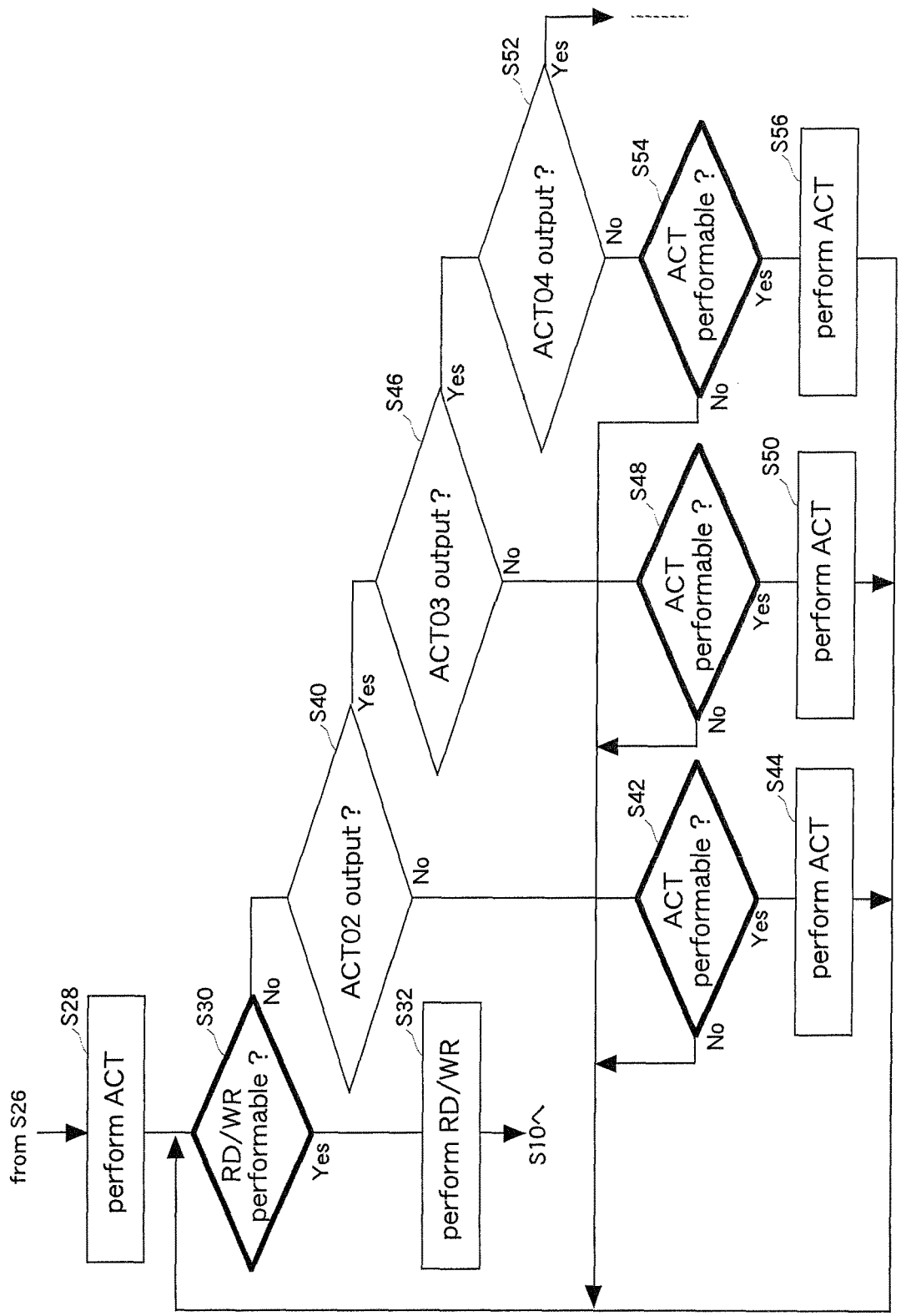
FIG. 16 is a flowchart showing an essential part of the operation of a memory controller in the third embodiment.

FIG. 16 shows an essential part of the operation of the memory controller MCNT in the third embodiment. FIG. 16 especially shows the operation of the command/address generating unit CAG. FIG. 16 is different from the first embodiment in the operations after step S30 in FIG. 6. The operations up to step S30 are the same as those of the first embodiment. In the heavy-line diamonds in the drawing, it is decided, based on the information from the timing adjustment unit TADJ shown in FIG. 1, whether or not a command is executable in a current clock cycle. The same reference numerals and symbols are used to designate the same elements as the elements described in the first embodiment, and detailed description thereof will be omitted.

In this embodiment, when it is decided at step S30 that a read command RD or a write command WR is not executable, the process goes to steps S40-S56. At step S40, upon receipt of the activate command ACT02 corresponding to the second access request from the miss/hit decision circuit MHD, the command/address generating unit CAG decides at step S42 whether or not the activate command ACT can be output. When the activate command ACT can be output, the activate command ACT corresponding to the second access request is output at step S44. When the activate command ACT02 is not output at step S40, the process goes to step S46.

At steps S46, S48, S50, the same processes as those at steps S40, S42, S44 described above are performed for the activate command ACT03 corresponding to the third access request. Similarly, at Steps S52, S54, S56, the same processes as those at Steps S40, S42, S44 described above are performed for the activate command ACT04 corresponding to the fourth access request.

Figure 17:
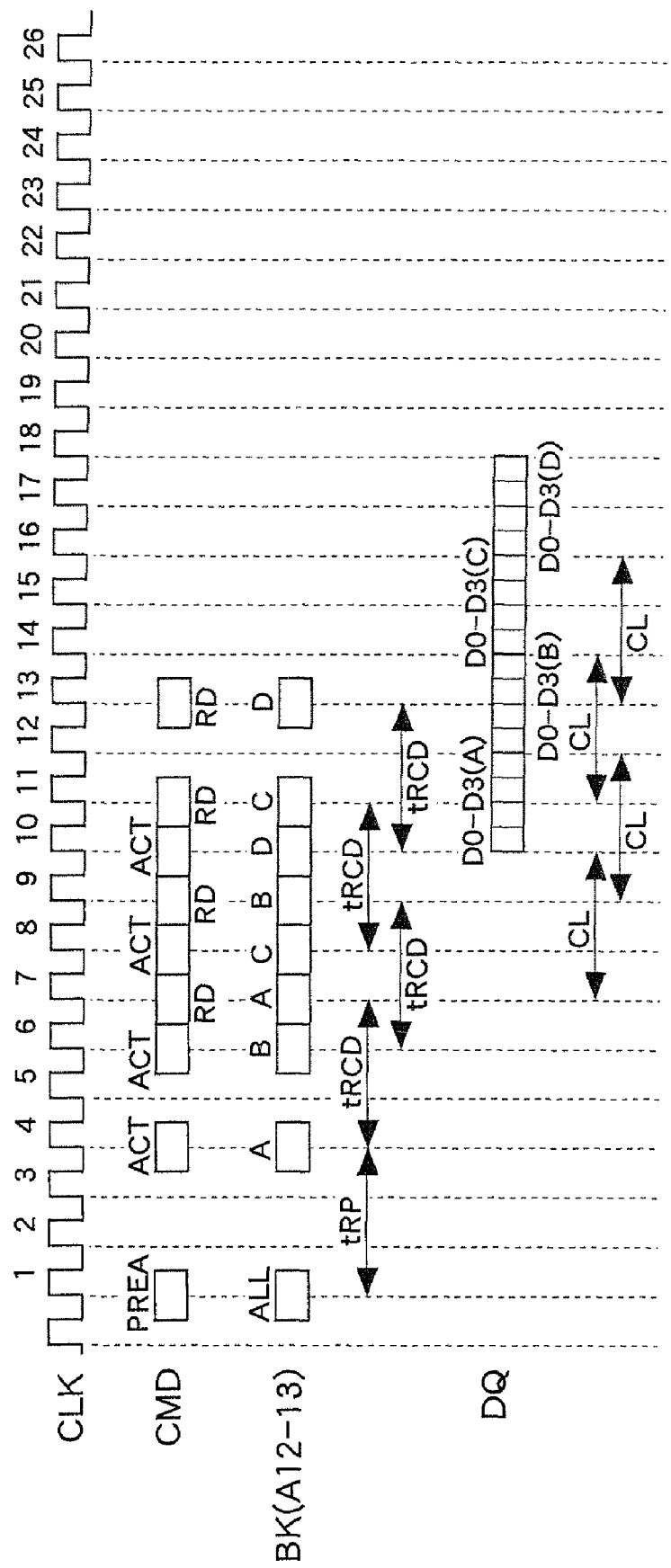
FIG. 17 is a timing chart showing the operations of the memory controller and a SDRAM in the third embodiment.

FIG. 17 shows the operations of the memory controller MCNT and the SDRAM in the third embodiment. In this example, by the process flow shown in FIG. 16, the activate command ACT in response to each of the second to fourth access requests is insertable between the activate command ACT and the read command RD.

The foregoing third embodiment can also provide the same effects as those of the above-described first embodiment. In addition, in this embodiment, the activate command ACT in response to each of the second to fourth access requests is inserted between the activate command ACT and the read command RD by the address analysis unit ADA, which enables further improvement in access efficiency.

The above embodiments have described the examples applied to the SDRAM operating in synchronization with clocks. For example, the present embodiments may be applied to a clock-asynchronous DRAM. The SDRAM and the DRAM may be in a chip form or may be macros mounted on a SoC.

The above embodiments have described the examples where the standard value as a basis of the comparison by the comparison unit COMP is set to "0". For example, in a case where the all-banks precharge command PREA is output when the decremental number of clock cycles is two or more, the standard value is set to "1". In this case, when the sum value Ssum is "+2" or more, the all-banks precharge command PREA is output. By thus changing the standard value, it is possible to easily change the decision criterion of the address analysis unit ADA.

The above embodiments have described the examples where based on the second to fourth access requests, it is decided whether to output the all-banks precharge command PREA or not. Or, the above embodiments have described the examples where based on the second to fourth access requests, it is decided whether to first execute the activate commands ACT corresponding to the second and subsequent access requests. For example, the decision in the address analysis unit ADA may be performed based on the fourth and subsequent access requests. Also in this case, no change in the score memory unit SCR is required.

A preposition of embodiments is to realize an efficient precharge operation of a plurality of banks, thereby improving access efficiency of a semiconductor memory.

In one aspect of the embodiment, since the plural successively supplied access requests serve as a basis of the decision on whether to output the all-banks precharge command or not, it is possible to efficiently supply a command to the semiconductor memory according to the states of the banks (page hit/page miss). Further, it is possible to precharge the plural banks only by supplying the all-banks precharge command once, and therefore all the banks can be precharged even in a case where there are only a small number of empty cycles for the insertion of a command, which can improve access efficiency.

For example, when a state of a page of a bank corresponding to a head access address among the plural held access addresses is page miss, the all-banks precharge command is output according to page hit/page miss of the bank corresponding to each of the plural second and subsequent access addresses. In other words, when the bank first accessed needs precharging, the all-banks precharge command is output according to the states of the banks accessed at and after the second time. This makes it possible to efficiently supply a command to the semiconductor memory even when the state of the first accessed bank is page miss.

For example, whether to output the all-banks precharge command or not is decided according to the sum of scores respectively set for the plural second and subsequent access addresses. Here, each of the scores indicates whether or not outputting the all-banks precharge command results in a decrease in the number of cycles necessary for accessing. The score is relatively large when the number of cycles decreases. The all-banks precharge command is output when the sum of the scores exceeds a preset standard value. Controlling the generated command based on the scores can facilitate control logic regarding whether to output all the bank-precharge command or not. Further, by programmably storing the scores, it is possible to easily change a weight factor of the scores, which makes it possible to easily change a criterion for deciding whether to output the all-banks precharge command or not.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A memory controller accessing a semiconductor memory including a plurality of banks each having a plurality of pages, the memory controller comprising:
   a request hold unit sequentially holding access requests which include access addresses each indicating a group of memory cells to be accessed and which are supplied from a system controller; and
   an address analysis unit receiving the access addresses held in the request hold unit to decide page hit/page miss of each of the banks corresponding to the access addresses, finding scores corresponding to the banks indicated by the access addresses, the scores each indicating access efficiency according to an all-banks precharge command for performing a precharge operation of all the banks, and outputting the all-banks precharge command when deciding, based on a sum of the scores, that outputting the all-banks precharge command results in improvement in the access efficiency.

2. The memory controller according to claim 1, wherein when a state of a page of a bank corresponding to a head access address among the access addresses held in the request hold unit is a page miss, the address analysis unit decides whether to output the all-banks precharge command, according to he sum of the scores corresponding to second and subsequent access addresses.

3. The memory controller according to claim 2, wherein the address analysis unit finds the scores for the second and subsequent access addresses respectively, each of the scores indicating whether or not outputting the all-banks precharge command results in a decrease in the number of cycles necessary for accessing and each of the scores being relatively large when the number of cycles decreases, and the address analysis unit outputs the all-banks precharge command when the sum of the scores exceeds a preset standard value.

4. The memory controller according to claim 3, further comprising
a score memory unit programmably storing the scores corresponding to states of the banks, wherein
the address analysis unit refers to the scores stored in the score memory unit to compare the sum of the scores with the standard value.

5. The memory controller according to claim 2, wherein
the address analysis unit outputs the all-banks precharge command prior to an activate command of the bank corresponding to the head access address.

6. The memory controller according to claim 2, wherein
the address analysis unit outputs a precharge command for performing the precharge operation of one of the banks corresponding to the head access address when deciding not to output the all-banks precharge command.

7. The memory controller according to claim 1, wherein
after outputting the all-banks precharge command, when an empty cycle in which a command is insertable exists between an activate command and one of a read and write command corresponding to each of the access addresses, the address analysis unit outputs a different activate command in correspondence to the empty cycle in order to activate at least one of idle banks corresponding to the second and subsequent access addresses.

8. A control method for accessing a semiconductor memory including a plurality of banks each having a plurality of pages, the method comprising:
sequentially holding access requests which include access addresses each indicating a group of memory cells to be accessed and which are supplied from a system controller;
deciding page hit/page miss of each of the banks corresponding to the held access addresses;
finding scores corresponding to the banks indicated by the access addresses, the scores each indicating access efficiency according to an all-banks precharge command for performing a precharge operation of all the banks; and outputting the all-banks precharge command when deciding, based on a sum of the scores, that outputting the all-banks precharge command results in improvement in the access efficiency.

9. The control method for accessing the semiconductor memory according to claim 8, wherein
when a state of a page of a bank corresponding to a head access address among the held access addresses is a page miss, it is decided whether to output the all-banks precharge command, according to the sum of the scores corresponding to second and subsequent access addresses.

10. The control method for accessing the semiconductor memory according to claim 9, wherein:
the scores are found for the second and subsequent access addresses respectively, each of the scores indicating whether or not outputting the all-banks precharge command results in a decrease in the number of cycles necessary for accessing and each of the scores being relatively large when the number of cycles decreases, and
the all-banks precharge command is output when the sum of the scores exceeds a preset standard value.

11. The control method for accessing the semiconductor memory according to claim 9, wherein
the all-banks precharge command is output prior to an activate command of the bank corresponding to the head access address.

12. The control method for accessing the semiconductor memory according to claim 9, wherein
a precharge command for performing the precharge operation of one of the banks corresponding to the head access address is output when it is decided not to output the all-banks precharge command.

13. The control method for accessing the semiconductor memory according to claim 8, wherein
after outputting the all-banks precharge command, when an empty cycle in which a command is insertable exists between an activate command and one of a read and write command corresponding to each of the access addresses, a different activate command is output in correspondence to the empty cycle in order to activate at least one of idle banks corresponding to the second and subsequent access addresses.

14. A system having a semiconductor memory including a plurality of banks each having a plurality of pages, at least one system controller outputting access requests for accessing the semiconductor memory and a memory controller outputting the access requests to the semiconductor memory, wherein
the memory controller comprises:
a request hold unit sequentially holding the access requests which include access addresses each indicating a group of memory cells to be accessed and which are supplied from the system controller; and
an address analysis unit receiving the access addresses held in the request hold unit to decide page hit/page miss of each of the banks corresponding to the access addresses, finding scores corresponding to the banks indicated by the access addresses, the scores each indicating access efficiency according to an all-banks precharge command for performing a precharge operation of all the banks, and outputting the all-banks precharge command when deciding, based on a sum of the scores, that outputting the all-banks precharge command results in improvement in the access efficiency.

15. The system according to claim 14, wherein
when a state of a page of a bank corresponding to a head access address among the access addresses held in the request hold unit is a page miss, the address analysis unit decides whether to output the all-banks precharge command, according to the sum of the scores corresponding to second and subsequent access addresses.

16. The system according to claim 15, wherein
the address analysis unit finds the scores for the second and subsequent access addresses respectively, each of the scores indicating whether or not outputting the all-banks precharge command results in a decrease in the number of cycles necessary for accessing and each of the scores being relatively large when the number of cycles decreases, and the address analysis unit outputs the all-banks precharge command when the sum of the scores exceeds a preset standard value.

17. The system according to claim 16, further comprising
a score memory unit programmably storing the scores corresponding to states of the banks, wherein
the address analysis unit refers to the scores stored in the score memory unit to compare the sum of the scores with the standard value.

18. The system according to claim 15, wherein
the address analysis unit outputs the all-banks precharge command prior to an activate command of the bank corresponding to the head access address.

19. The system according to claim 15, wherein
the address analysis unit outputs a precharge command for performing the precharge operation of one of the banks corresponding to the head access address when deciding not to output the all-banks precharge command.

20. The system according to claim 14, wherein
after outputting the all-banks precharge command, when an empty cycle in which a command is insertable exists between an activate command and one of a read and write command corresponding to each of the access addresses, the address analysis unit outputs a different activate command in correspondence to the empty cycle in order to activate at least one of idle banks corresponding to the second and subsequent access addresses.

* * * * *